United States Patent [19]

Tsunehirō et al.

[11] Patent Number: 4,642,625
[45] Date of Patent: Feb. 10, 1987

[54] GRAPHIC PROCESSOR FOR COLOR AND POSITIONAL DATA OF AN IMAGE TO BE DISPLAYED

[75] Inventors: Takashi Tsunehiro, Yokohama; Shigeo Tsujioka, Higashiyamoto, both of Japan

[73] Assignee: Hitachi, Ltd., Tokyo, Japan

[21] Appl. No.: 559,267

[22] Filed: Dec. 8, 1983

[30] Foreign Application Priority Data

Dec. 10, 1982 [JP] Japan .................................. 57-215422

[51] Int. Cl.$^4$ .............................................. G09G 1/14
[52] U.S. Cl. ...................................... 340/747; 340/703
[58] Field of Search ............... 340/703, 747, 798, 799, 340/800, 745

[56] References Cited

U.S. PATENT DOCUMENTS

| | | | |
|---|---|---|---|
| 3,893,075 | 7/1975 | Orban et al. | 340/747 |
| 4,425,559 | 1/1984 | Sherman | 340/703 |
| 4,442,503 | 4/1984 | Schütt et al. | 340/747 |
| 4,458,330 | 7/1984 | Imsand et al. | 340/747 |
| 4,491,836 | 1/1985 | Collmeyer et al. | 340/747 |

*Primary Examiner*—Gerald L. Brigance
*Attorney, Agent, or Firm*—Antonelli, Terry & Wands

[57] ABSTRACT

A graphic processor is provided with a buffer corresponding to one of a plurality of display blocks forming a display face, and a refresh memory connected to the buffer. The buffer stores therein only position information of dots which are included in one display block and are a portion of dots forming a pattern. In the refresh memory, dots are stored in a memory region corresponding to the display block at positions indicated by the above position information, in accordance with color data supplied independently of the position information. This processing is performed for all of display blocks where the pattern is present, to write pattern data in the refresh memory. Thus, it is not required to provide buffers, the number of which is equal to the number of colors used for displaying the pattern in colors, but the number of buffers can be reduced.

23 Claims, 9 Drawing Figures

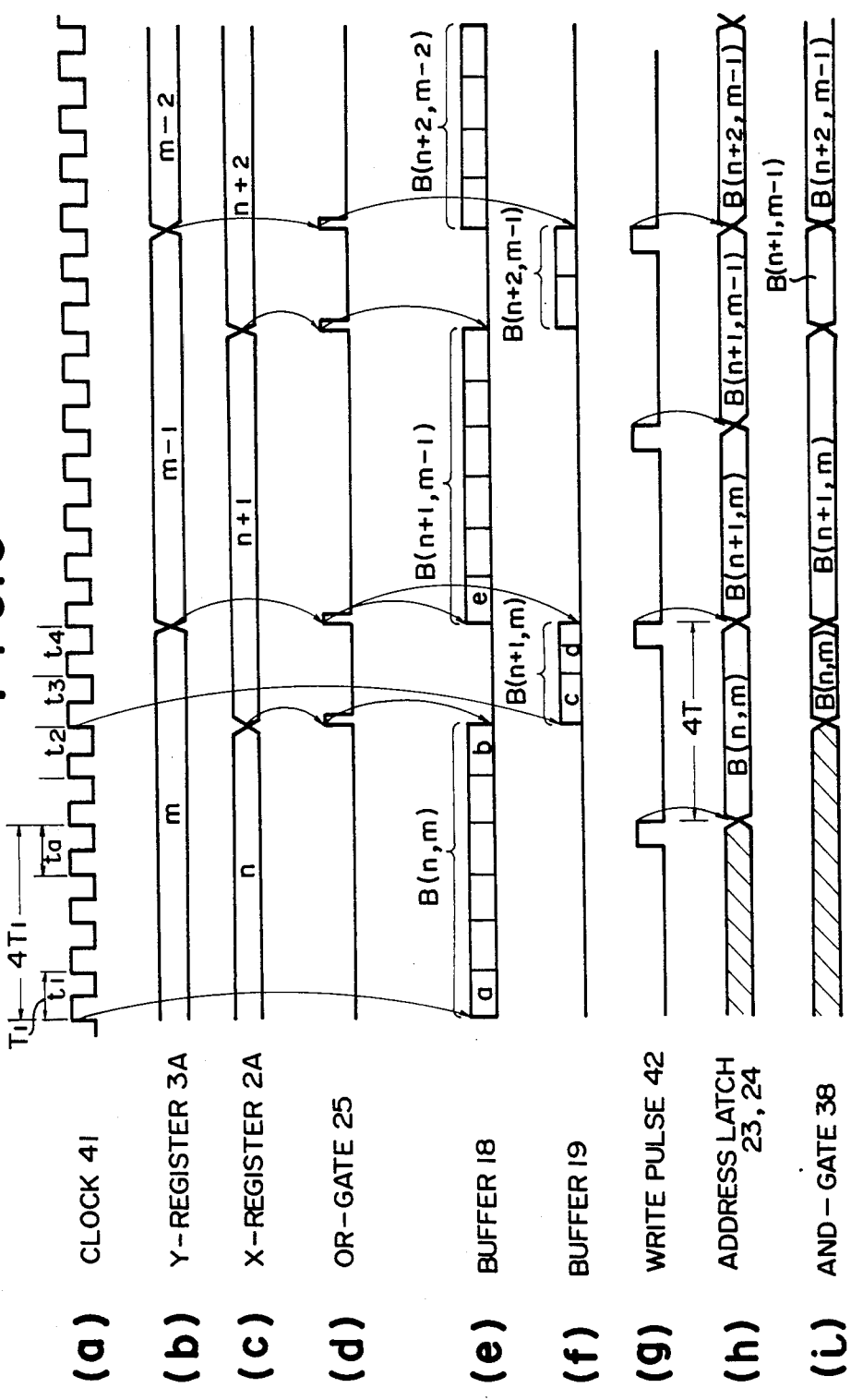

GRAPHIC PROCESSOR FOR COLOR AND POSITIONAL DATA OF AN IMAGE TO BE DISPLAYED

BACKGROUND OF THE INVENTION

The present invention relates to a graphic processor for producing pattern display data for use in, for example, a CRT display device.

In a pattern display system for displaying a pattern by a group of dots, a straight line is displayed by a line of dots such as shown in FIG. 1. FIG. 1 shows the case where a display plane is divided into 1024 equal parts in each of transverse and longitudinal directions, namely, in the direction of each of X- and Y-axes. In FIG. 1, coordinates are assigned to the display plane in such a manner that divisions placed in the upper left, upper right, lower left and lower right corners have coordinates (0, 0), (1023, 0), (0, 1023) and (1023, 1023), respectively. The so-called refresh memory has memory areas which correspond to divisions on the display plane in a one-to-one relation and store display data. The refresh memory is accessed in synchronism with the scanning operation in a CRT display device.

A graphic processor shown in FIG. 2 has hitherto been used to display patterns. Referring to FIG. 2, a vector generator 1 converts a line segment to be displayed into a line of dots, and sets the X- and Y-coordinates of each dot in an X-address register 2 and a Y-address register 3, respectively. The vector generator 1 delivers not only the above-mentioned X- and Y-coordinates but also pattern data indicating the color of the line segment. The pattern data from the vector generator 1 is not supplied to a refresh memory 5 but is written in a refresh memory buffer (hereinafter simply referred to as "buffer") 4 at a position specified by the lower n bits of each of the X-address register 2 and Y-address register 3. The buffer 4 has a pattern data storing area corresponding to that partial region on the display face of the CRT which is formed of $2^n \times 2^n$ dots (for example, n=3). When the vector generator 1 generates pattern data in a different partial region in addition to pattern data in a desired partial region, an overflow detecting circuit 6 detects such a situation, and the pattern data stored in the buffer 4 (and corresponding to $2^n \times 2^n$ dots) is written in the refresh memory 5 in parallel. Thereafter, the same operation is performed for each of the other partial regions, and pattern data is successively written in the refresh memory 5. Thus, all of the pattern data to be displayed on the display face are written in the refresh memory 5. The buffer 4 is provided to eliminate the waiting time of the vector generator 1 caused by the low writing speed for the refresh memory 5. In more detail, since the operating speed of the vector generator 1 is higher than that of the refresh memory 5, the output of the vector generator 1 is temporarily stored in the buffer 4, and then the contents of the buffer 4 are written in the refresh memory 5 in parallel, thereby preventing the vector generator 1 from being stopped.

According to such a prior art device, however, when a pattern is displayed in a plurality of colors, a plurality of bits are necessary for indicating the kind of color, and a number of buffers equal to the number of colors are required.

Further, in the prior art, pattern data corresponding to $2^n \times 2^n$ dots are written in a partial area of the refresh memory 5 in parallel, and therefore pattern data having already been written in the partial area are erased by new pattern data being written.

Furthermore, when pattern data overflows the buffer 4 and the contents of the buffer 4 are transferred to the refresh memory 5 in parallel, the buffer 4 must hold the pattern data till all of the pattern data in the buffer 4 has been written in the refresh memory 5. The writing operation of the vector generator 1 for the buffer 4 is stopped for this period, and therefore an undesirable waiting time is required.

In addition, in the case where pattern data is written in only an edge portion of the buffer 5, an overflow is caused by writing the pattern data of only a few dots in the buffer, and thus a writing operation for the refresh memory 5 is required. Accordingly, the vector generator 1 must wait till the writing operation for the refresh memory 5 is completed, and is kept at the stand-by state for a longer time than the operating time thereof.

SUMMARY OF THE INVENTION

A first object of the present invention is to provide a graphic processor which can write pattern data for color display in a refresh memory by using a buffer with a smaller capacity.

A second object of the present invention is to provide a graphic processor which can write new pattern data in a refresh memory without erasing pattern data stored therein.

A third object of the present invention is to provide a graphic processor which can operate a vector generator without having any waiting time, for a period when pattern data is sent from a buffer to a refresh memory to be written therein.

A fourth object of the present invention is to provide a graphic processor which can operate a vector generator without having any waiting time, even if a writing operation for a refresh memory is required in the state that pattern data has been written in only an edge portion of a buffer.

In order to attain these objects, according to the present invention, there is provided a graphic processor in which pattern data sent out from a vector generator is stored in a data register, positions at which the pattern data is to be written in a refresh memory, are stored in a buffer, and the pattern data from the data register is written in the refresh memory at positions stored in the buffer.

BRIEF DESCRIPTION OF THE DRAWINGS

FIG. 9 is a timing chart for explaining the operation of the embodiment shown in FIG. 3.

DESCRIPTION OF THE PREFERRED EMBODIMENT

Figure 1:
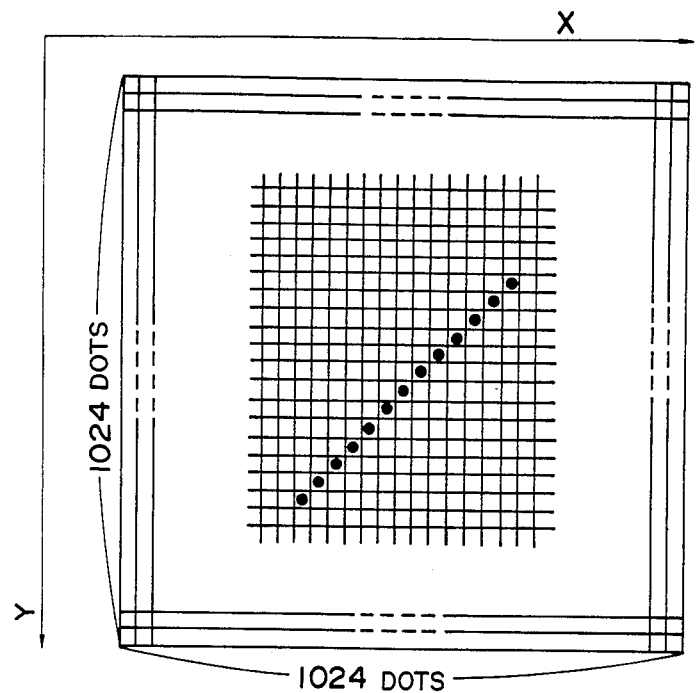
FIG. 1 shows the display state of a straight line on a conventional display plane.
Figure 2:
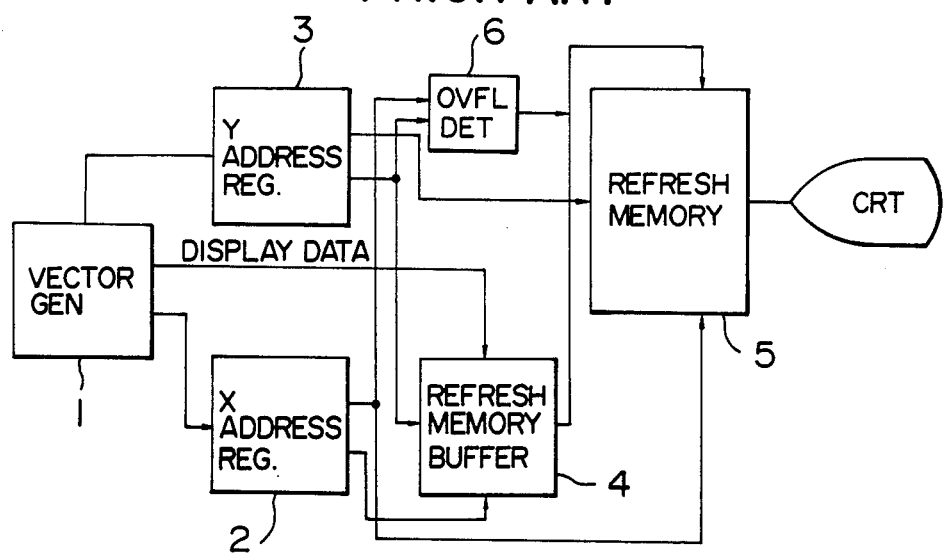
FIG. 2 is a block diagram showing a conventional graphic processor.
Figure 3:
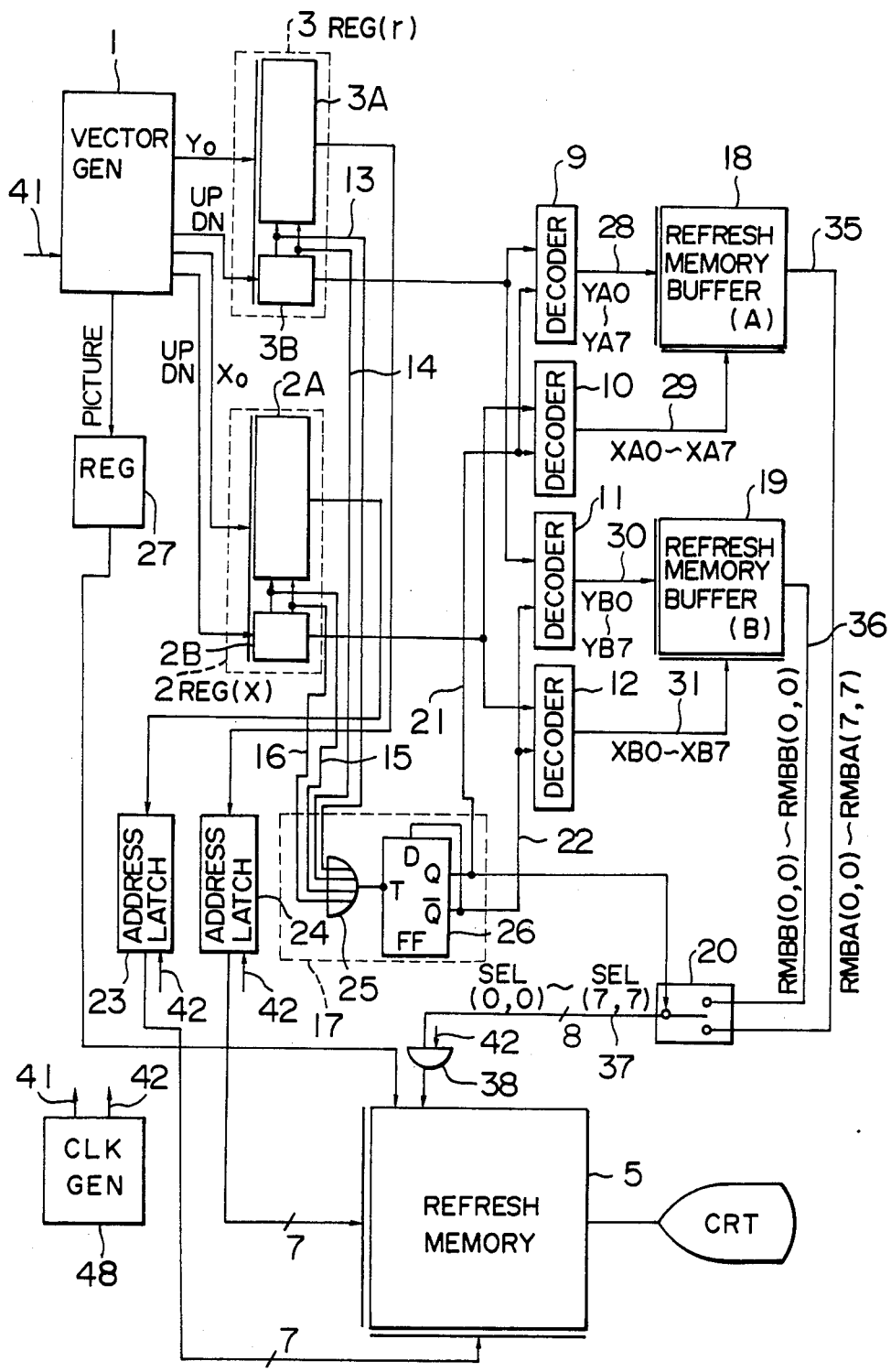
FIG. 3 is a block diagram showing an embodiment of a graphic processor according to the present invention.
Figure 4:
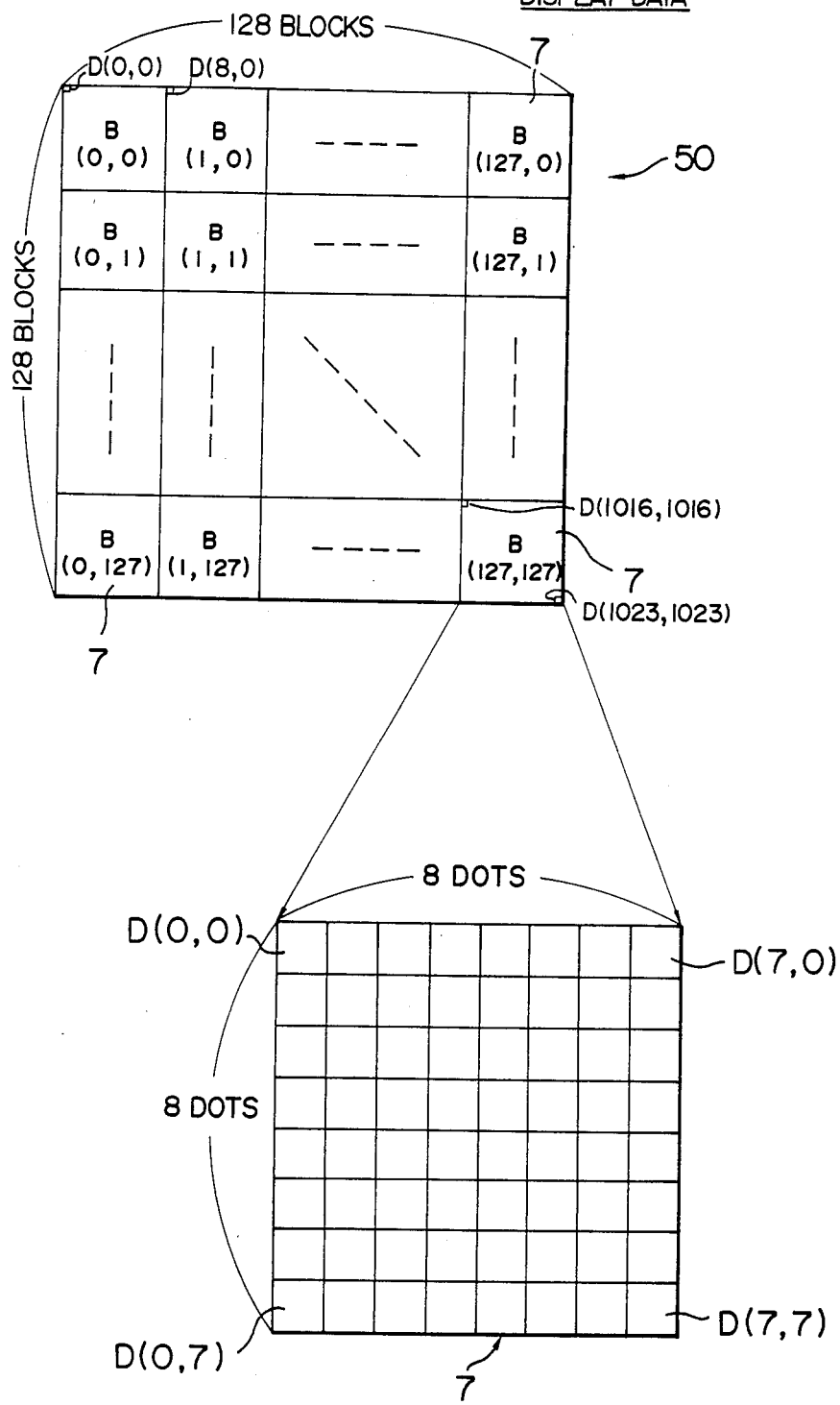
FIG. 4 shows how a display plane is divided in the embodiment of FIG. 3.

FIG. 3 shows an embodiment of a graphic processor according to the present invention. Prior to explaining the embodiment shown in FIG. 3, a display plane used in the present embodiment will be explained, with reference to FIG. 4. Referring to FIG. 4, a display plane 50 is formed of 128×128 display blocks 7, and each display block 7 is formed of 8×8 dots. That is, the display plane 50 is formed of 1,024×1,024 dots. In other words, 128 display blocks are arranged in each of X- and Y-directions of the display plane, respectively, and thus 16,384 display blocks are included in the display plane. These display blocks are given coordinates in such a manner that a block occupying the upper left corner of the display plane, a block occupying the upper right corner, a block occupying the lower left corner and a block occupying the lower right corner have coordinates B(0, 0), B(127, 0), B(0, 127) and B(127, 127), respectively. Further, the dots are given coordinates in such a manner that a dot 47 occupying the upper left corner of the block having the coordinate B(0, 0) and a dot 49 occupying the lower right corner of the block having the coordinate B(127, 127) have coordinates D(0, 0) and D(1,023, 1,023), respectively. As a result, a display block having a coordinate B(n, m) includes 64 dots having coordinates D(8n, 8m) to D(8n+7, 8m+7).

Figure 5:
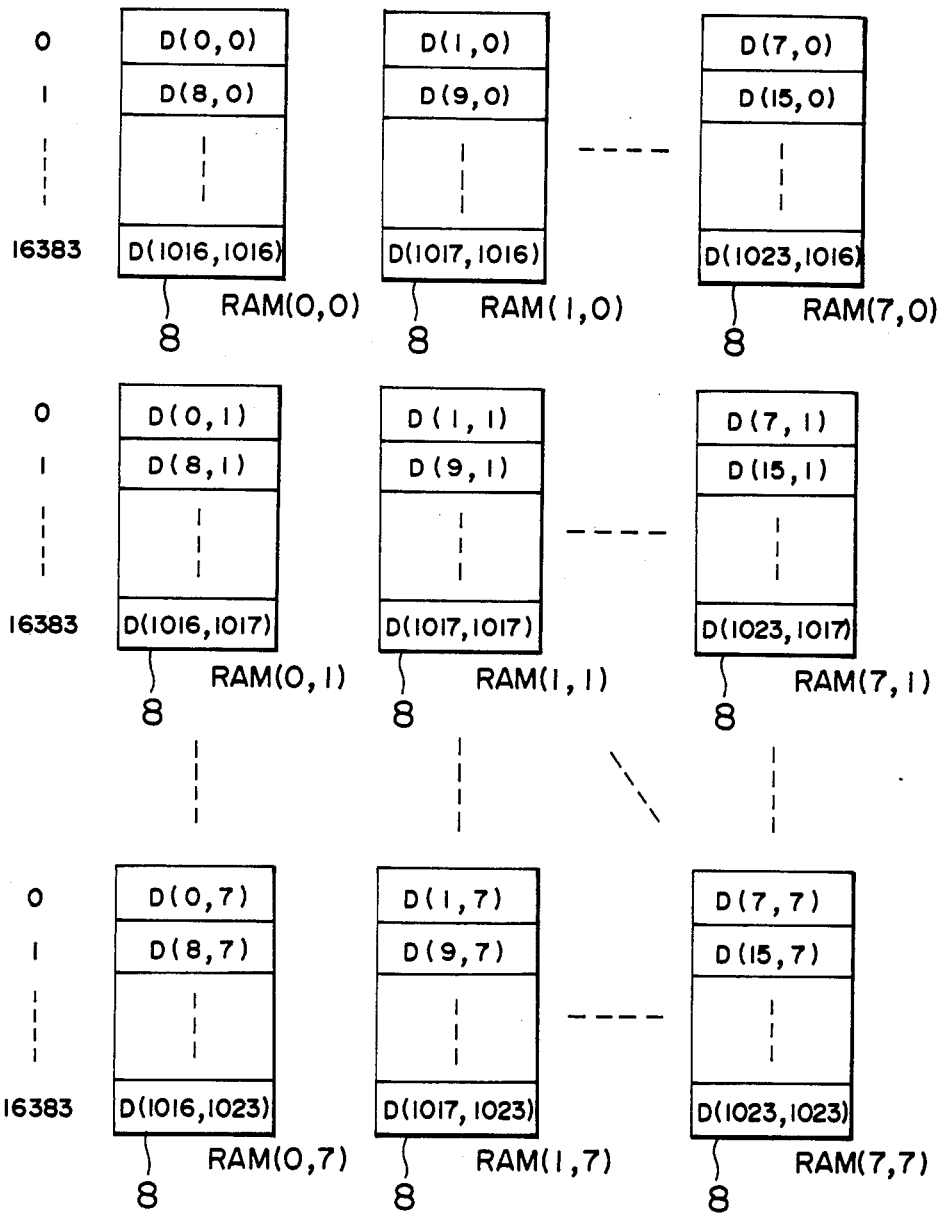
FIG. 5 shows an address arrangement in each of random access memories (RAM's) making up the refresh memory shown in FIG. 3.

When a RAM of 16,384×one bit structure is used for forming a refresh memory having 1,024×1,024 bits, 64 RAM's are required. FIG. 5 shows an address arrangement in the case where a refresh memory is made up of 64 RAM's. Referring to FIG. 5, 64 RAM's are arranged to correspond to 64 dots making up one display block 7. Further, coordinates D(0, 0), D(8, 0), . . . D(1,016, 1,016) indicating the dot placed in the upper left corner of each display block are all stored in an RAM (0, 0) which is placed in the upper left corner of FIG. 5, and coordinates D(1, 0), D(9, 0) . . . and D(1,017, 1,016) indicating the second dot from the upper left corner of each display block are all stored in the second RAM(1, 0) from the upper left corner of FIG. 5. All of the addresses of 64 dots are arranged in 64 RAM's in a similar manner. Thus, the addresses of 64 dots forming a given display block are stored in the RAM's 8, and 64 dots can be written in the 64 RAMs 8 at the above addresses at one time. Such a writing operation will be explained later in detail, with reference to FIG. 7.

Referring back to FIG. 3, a clock generator 48 delivers clock pulses 41, and a write pulse 42 which will be explained later. The write pulse 42 is generated each time four clock pulses have been generated, as shown in FIG. 9. The vector generator 1 receives the clock pulses 41, and delivers a signal indicating respective positions of dots which represent a plurality of line segments forming a pattern to be displayed, in synchronism with the clock pulses 41. In more detail, 10-bit data indicating the X-coordinate of the first dot representative of the starting point of a line segment and 10-bit data indicating the Y-coordinate of the first dot are set in an X-address register 2 and a Y-address register 3, respectively. As regards the coordinates of the second, third, . . . and final dots on the same line segment, an increment (UP) signal or decrement (DN) signal indicating a difference in X-coordinate between a dot and the next dot is given to a lower X-register 2B, and a similar UP- or DN-signal with respect to Y-coordinate is given to a lower Y-register 3B. The vector generator 1 delivers the UP- or DN-signal with respect to each of the X- and Y-coordinates one after another in synchronism with the clock pulses 41. The Y-address register 3 includes an upper Y-register 3A and the lower Y-register 3B, and the X-address register 2 includes an upper X-register 2A and the lower X-register 2B. Each of the lower Y-register 3B and lower X-register 2B has 3 bits, and each of the upper Y-register 3A and upper X-register 2A has 7 bits. Each of the X-address register 2 and Y-address register 3 is formed of an up/down counter. The lower registers of the address registers 2 and 3, that is, the lower X-register 2B and the lower Y-register 3B count up or down according to whether they receive the UP-signal or DN-signal from the vector generator 1. A carry signal 13 and a borrow signal 14 each sent out from the lower Y-register 3B, are supplied to the upper Y-register 3A and a buffer control circuit 17. Similarly, a carry signal 15 and a borrow signal 16 each sent out from the lower X-register 2B are supplied to the upper X-register 2A and buffer control circuit 17. The buffer control circuit 17 controls a selector 20 for the outputs 35 and 36 of buffers 18 and 19. While, the output of the lower Y-register 3B is applied to decoders 9 and 11, and the output of the lower X-register 2B is applied to decoders 10 and 12. Data from the decoders 9 to 12 are written in the buffers 18 and 19. The decoders 9 and 11 decode a 3-bit signal from the lower Y-register 3B. An 8-bit output 28 from the decoder 9 is set in the buffer 18 or an 8-bit output 30 from the decoder 11 is set in the buffer 19, according to whether an enable input 21 or 22 is set. The decoders 10 and 12 decode a 3-bit signal from the lower X-register 2B. An 8-bit output 29 from the decoder 10 is set in the buffer 18 or an 8-bit output 31 from the decoder 12 is set in the buffer 19, according as the enable input 21 or 22 is set.

The enable inputs 21 and 22 are given by the Q- and $\overline{Q}$-outputs of the buffer control circuit 17, respectively. The enable input 21 is also applied to the selector 20. When the enable input 21 is set, the output 36 of the buffer 19 is taken out as a selective output 37. When the enable input 21 is reset, the output 35 of the buffer 18 is used as the selective output 37. Thus, the buffers 18 and 19 are alternately put in a writing state, in other words, one and the other of the buffers 18 and 19 are put in writing and reading states, respectively.

The outputs of the upper X-register 2A and upper Y-register 3A are applied through address latches 23 and 24 to a refresh memory 5, to determine an address thereon. The address latches 23 and 24 latch the outputs of the upper X-register 2A and upper Y-register 3A, respectively, at the falling edge of the write pulse 42.

The buffer control circuit 17 is made up of an OR gate 25 and a flip-flop 26. The carry signal 13 and borrow signal 14 from the lower Y-register 3B as well as the carry signal 15 and borrow signal 16 from the lower X-register 2B are applied to the OR gate 25, the output of which is supplied to a trigger input of the flip-flop 26, to invert both the outputs Q and $\overline{Q}$ of the flip-flop 26. The buffer control circuit 17 makes it possible to detect that an X- or Y-coordinate value is outside the range of the buffer in one of the buffers 18 and 19.

An AND gate 38 is connected to receive the selective output 37 and write pulse 42, and the output of the AND gate 38 is supplied to the refresh memory 5.

While, pattern data indicating a pattern to be displayed is previously sent out from the vector generator 1 and written in a data register 27. For black-and-white display, the data register 27 stores only one bit of value one. For color display, the register 27 is required to have a plurality of bits indicating the kind of color of a pattern to be displayed. It is a matter of course that a plurality of refresh memory planes equal in number to the above-mentioned bits are required for color display. In the present embodiment, one bit is used for indicating pattern data, for brevity.

The writing and reading operations for the buffers 18 and 19, the selection of data to be written in the refresh memory 5, and the setting of positions at which data is written in the refresh memory 5, are carried out in the above-mentioned manner. The timing of this processing will be explained later, with reference to FIG. 9.

Next, the structure of each buffer and that of the refresh memory will be explained in detail.

Signals YA0 to YA7 forming the 8-bit output 28 of the decoder 9 and signals XA0 to XA7 forming the 8-bit output 29 of the decoder 10 are applied to the buffer 18. While, signals YB0 to YB7 forming the 8-bit output 30 of the decoder 11 and signals XB0 to XB7 forming the 8-bit output 31 of the decoder 12 are applied to the buffer 19.

Figure 6:
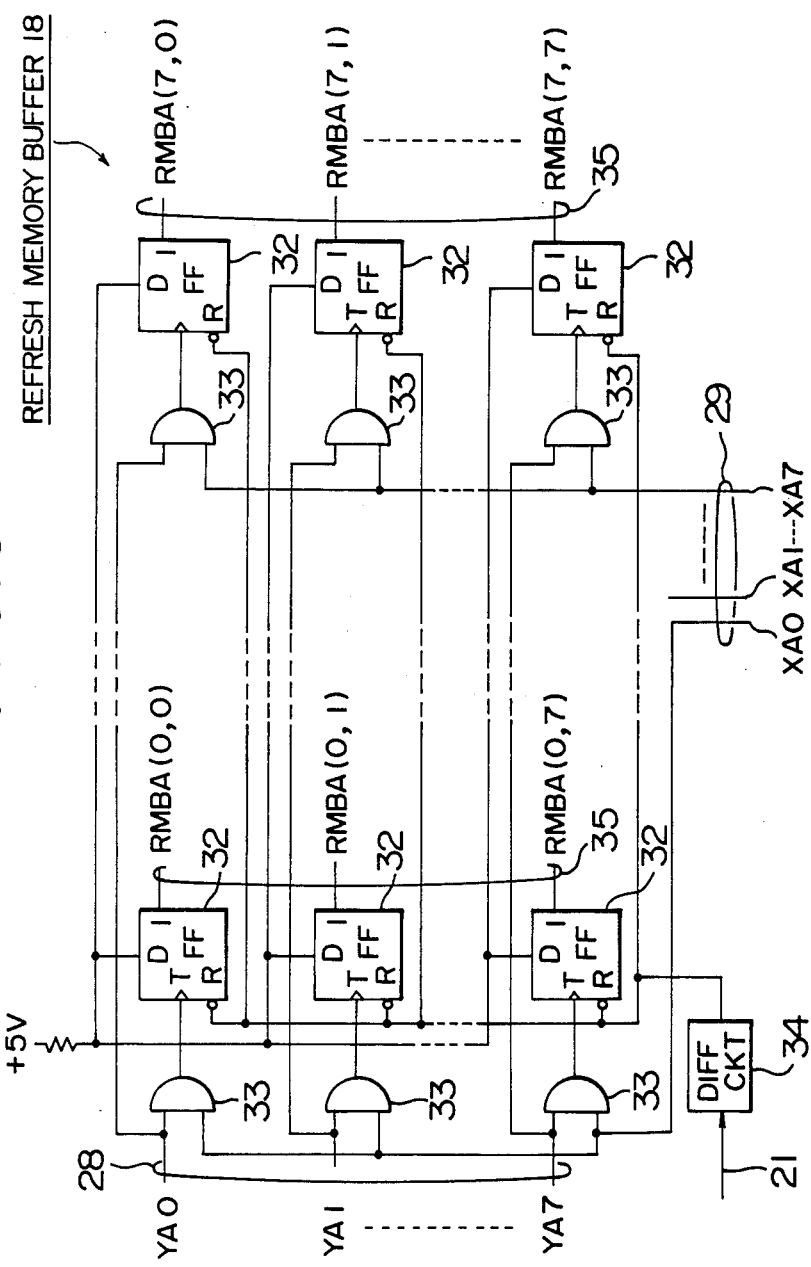
FIG. 6 is a circuit diagram showing the circuit configuration of one of the buffers shown in FIG. 3.

Since the buffers 18 and 19 have the same structure, the circuit configuration of the buffer 18 is shown in FIG. 6, by way of example. Referring to FIG. 6, the buffer 18 includes 64 flip-flops 32, 64 AND gates 33, and a differentiating circuit 34. The differentiating circuit 34 is connected to the reset terminal R of each flip-flop, and resets all of 64 flip-flops at the moment the output 21 of the buffer control circuit 17 takes the level of "1", that is, the moment the writing operation for the buffer 18 is started.

Now, let us assume that the signals YA0 and XA0 are set, then, only a flip-flop occupying the upper left corner is set and the other 63 flip-flops are not set. When the vector generator 1 specifies another dot position, only a different flip-flop corresponding to the specified dot position is set. The outputs 35 of the flip-flops are designated by 64 reference symbols RMBA(0, 0) to RMBA(7, 7). For the buffer 19, the signals YB0 to YB7 are used in place of the signals YA0 to YA7, the signals XB0 to XB7 are used in place of the signals XA0 to XA7, outputs RMBB(0, 0) to RMBB(7, 7) are substituted for the outputs RMBA(0, 0) to RMBA(7, 7) of the flip-flops, and the output 22 of the buffer control circuit 17 is applied to the differentiating circuit 34 in place of the output 21.

The outputs of the flip-flops are sent to the selector 20. Either the outputs RMBA(0, 0) to RMBA(7, 7) or outputs RMBB(0, 0) to RMBB(7, 7) from one of the buffers 18 and 19 which is now subjected to a reading operation, are selectively sent from the selector 20 to the refresh memory 5.

As shown in FIG. 3, the selector 20 selects the output 35 of the buffer 18 or the output 36 of the buffer 19 according to the level of "0" or "1" at the output Q of the flip-flop 26, so as to attain selective output 37 including 64 signals SEL(0, 0) to SEL(7, 7).

Figure 7:
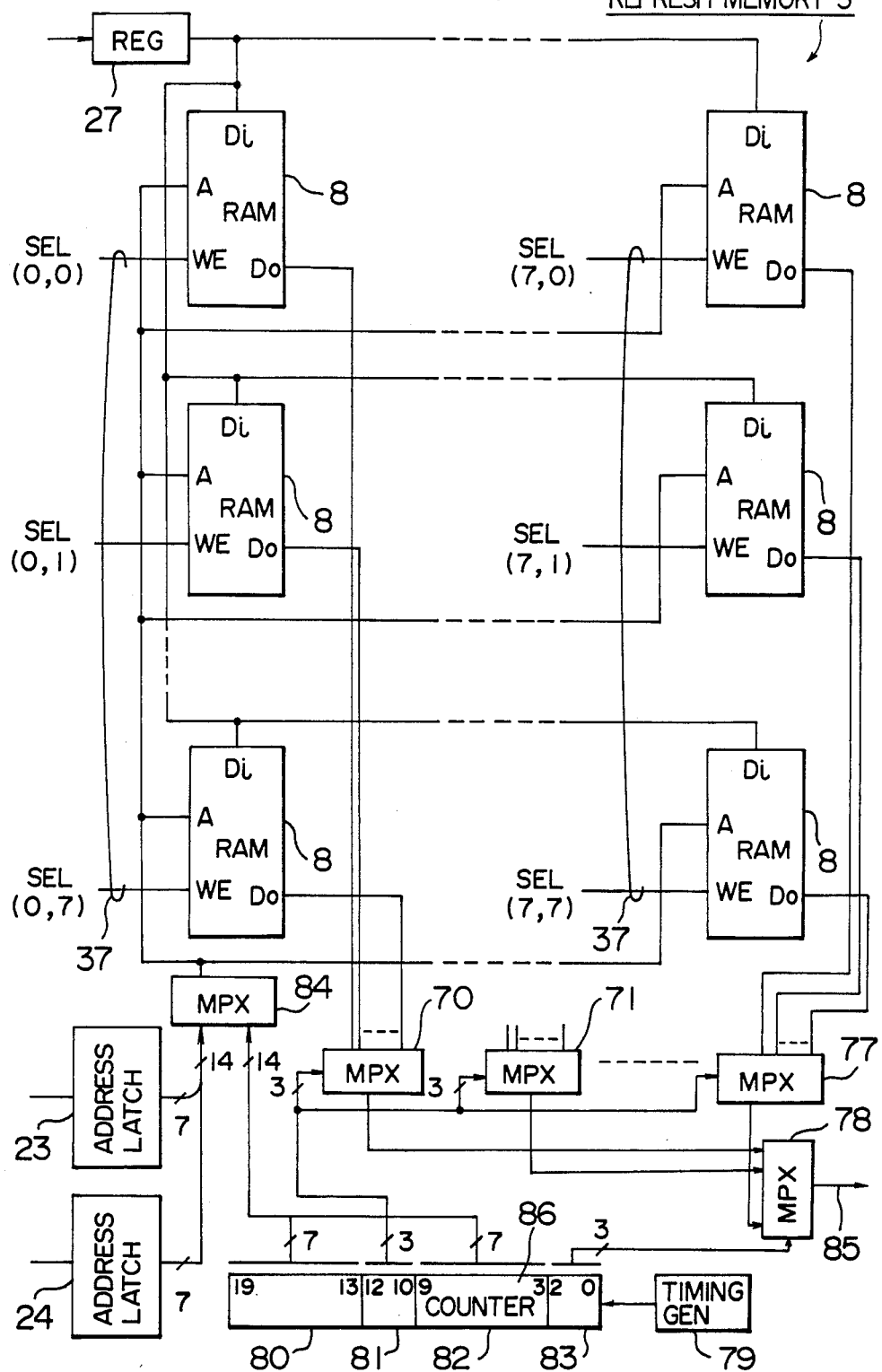
FIG. 7 is a block diagram showing the circuit configuration of the refresh memory shown in FIG. 3.

FIG. 7 shows details of the refresh memory 5 and its periphery. The selective output 37 from the selector 20 acts as a write enable signal WE for each RAM (that is, each memory element) 8. The data input terminals Di of 64 memory elements are all connected to the data register 27, which holds therein data to be written in the refresh memory 5. This data is sent to all of the memory elements, but is written in only some memory elements which are specified using the write enable signals SEL(0, 0) to SEL(7, 7). The remaining memory elements are left unchanged, that is, the contents of each of the remaining memory elements are kept unchanged. Thus, data is written in memory portions corresponding to one display block 7 at one time.

Figure 8:
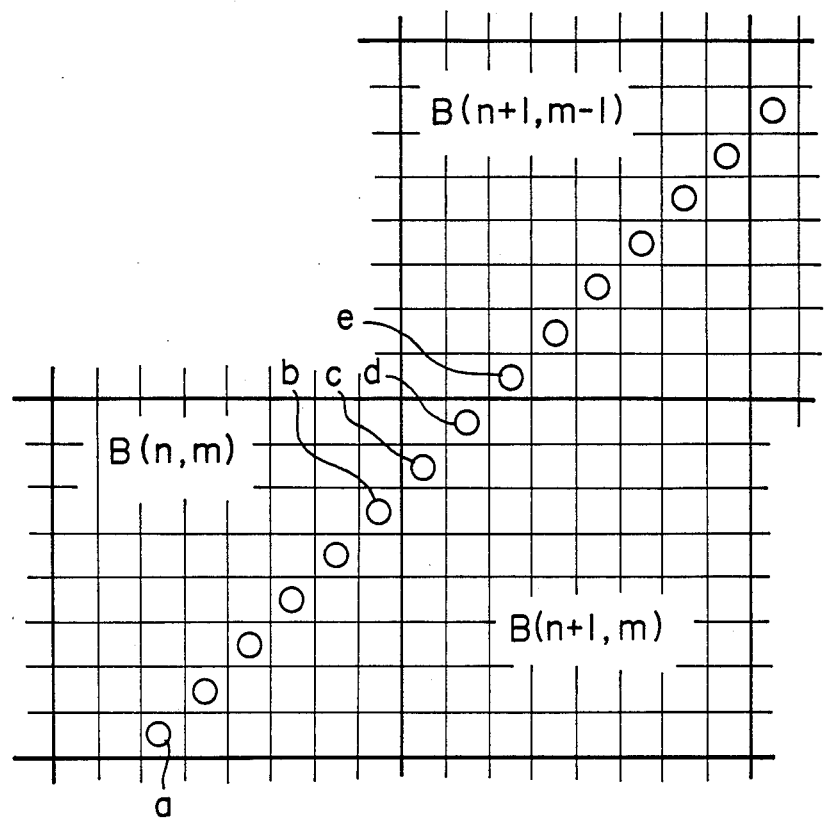
FIG. 8 shows a straight line extending over three display blocks which is displayed by the embodiment shown in FIG. 3.

In order to clarify the details of the above processing, let us consider the case where a straight line shown in FIG. 8 is written in the refresh memory 5. The straight line starts with a display block having a coordinate B(n, m), and is directed toward the upper right. Two display blocks whose X- or Y-coordinates differ by one from each other, are called adjacent display blocks for example B(n, m) and B(n+1, m). The number of dots required for expressing the straight line in the pair of adjacent display blocks is equal to or less than 8. In other words, not more than eight dots are written in such adjacent memory blocks.

That is, it is required to update eight dots or less in the buffers 18 and 19. Now, let us consider the case where an access time $T_2$ to the refresh memory 5 is four times longer than a time $T_1$ necessary for the vector generator 1 to determine the address of one dot, that is, $T_2=4T_1$. It takes a time $8T_2$ to determine the addresses of eight dots. While, a time $2T_2$ is required to write 8 dot positions from the buffers 18 and 19 in the refresh memory 5. However, since the time $T_2$ is equal to the time $4T_1$, the time required for determining the addresses of eight dots is equal to the time required for writing 8 dot positions in the refresh memory 5. Thus, each of the writing operation for the buffers and the writing operation for the refresh memory is duly performed. This will be depicted in the time charts shown in FIG. 9.

A waveform (a) in FIG. 9 shows reference clock pulses 41 supplied to the vector generator 1. The vector generator 1 delivers dot position signals successively in synchronism with the clock pulses 41. Now, let us consider the case where dot data in a display block having a coordinate B(n, m) is written in the buffer 18. The X- and Y-coordinates of a dot a in the above display block are outputted from the vector generator 1 in a period $t_1$. At this time, the contents of the upper Y-register 3A are made equal to m as shown in (b) of FIG. 9, and the contents of the upper X-register 2A are made equal to n as shown in (c) of FIG. 9. A flip-flop which is included in the buffer 18 and delivers the output RMBA(2, 7), is set by the decoders 9 and 10. Similarly, contiguous dots are successively set in the buffer 18, and finally a dot b is set in a flip-flop which is included in the buffer 18 and delivers the output RMBA(7, 2), in a period $t_2$, as shown in (e) of FIG. 9.

Immediately thereafter, a carry from the lower X-register 2B is generated. As a result, the OR gate 25 delivers a pulse as shown in (d) of FIG. 9, to invert the outputs Q and $\overline{Q}$ of the flip-flop 26. That is, dots are now written in the buffer 19, and the output 35 of the buffer 18 passes through the selector 20 to be used as the selective output 37 as shown in (i) of FIG. 9.

Next, in a period $t_3$, a dot c in a display block having a coordinate B(n+1, m) is set in a flip-flop which is included in the buffer 19 and delivers the output RMBB(0, 1), by the decoders 11 and 12, and the contents of the upper X-register 2A are changed to (n+1) as shown in (c) of FIG. 9. Similarly, the next dot d in the display block having the coordinate B(n+1, m) is set in the buffer 19 in a period $t_4$ as shown in (f) of FIG. 9.

The write pulse 42 is generated in a period corresponding to every fourth pulse interval of the clock pulses 41 (for example, in the latter half of the period $t_a$), as shown in (g) of FIG. 9. The write pulse 42 is supplied to the AND gate 38, to allow the selective output 37 to be written in the refresh memory 5. In the period $t_a$ however, a zero is written in the refresh memory 5 by the write pulse 42, since the data register 27 is not yet set. The contents of each of the upper X-register 2A and upper Y-register 3A are latched at the falling edge of the write pulse 42 generated in the latter half of the period $t_a$, as shown in (h) of FIG. 9.

The write pulse 42 is also generated in the latter half of the period $t_4$. At this time, the data register 27 has been set. Accordingly, data on the data register, i.e. 1 is written in each of memory elements 8 which are specified by the output 35 of the buffer 18 acting as the selective output 37, at an address specified by the latches 23 and 24. Thereafter, the buffers 18 and 19 are alternately operated in the above-mentioned manner.

In the foregoing description, explanation has been made on the case where a straight line is stored in the refresh memory 5. At the final stage, data in the refresh memory 5 is sent to a CRT monitor dot by dot, to be displayed thereon. The final stage will be briefly explained below. Referring back to FIG. 7, a display counter 86 has 20 bits, and is divided into four parts, that is, a first part including the zero-th to second bits, a second part including the third to ninth bits, a third part including the tenth to twelfth bits, and a fourth part including the thirteenth to nineteenth bits. The first, second, third and fourth parts are hereinafter referred to as a counter 83, a counter 82, a counter 81 and a counter 80, respectively. The display counter 86 counts up pulses which are generated by a timing generator 79 at a fixed time interval. The counters 80, 81, 82 and 83 hold upper 7 bits of an address in the direction of Y-axis, lower 3 bits of this Y-address, upper 7 bits of an address in the direction of X-axis, and lower 3 bits of the X-address, respectively. The outputs of the counters 80 and 82 are applied to a multiplexer (hereinafter simply referred to as "MPX") 84. The MPX 84 selects the outputs of the counters 80 and 82 for its output during the time the vector generator 1 delivers no coordinates of a dot. The output of the counter 81 is applied to the select input terminal of each of the MPX's 70 to 77. Of data read out of the memory elements arranged in the form of an $8 \times 8$ matrix, 8-dot data in a row specified by the counter 81 is outputted from the MPX's 70 to 77. The outputted data is applied to an 8-input, 1-outputed MPX 78. The output of the counter 83 is applied, as a select signal, to the MPX 78. Accordingly, of eight dots supplied to the MPX 78, only a dot in a column specified by the counter 83 is sent to the CRT monitor through a signal line 85. Thus, one dot is sent from the MPX 78 to the CRT monitor each time one pulse is generated by the timing generator 79, in such a manner that a raster scan is carried out.

As mentioned previously, even when a writing operation for the refresh memory 5 is performed, the vector generator 1 continues to operate, to expedite the data processing.

As has been explained in the foregoing, according to the present embodiment, the color of a pattern is separated from data indicating the position of the pattern, and only data indicating the position of the pattern is stored in a pair of buffers. Accordingly, it is unnecessary to provide buffers, the number of which is equal to the number of colors used.

Further, according to the present embodiment, pattern data is written in the refresh memory 5 on the basis of the position signals stored in the buffers, and therefore data in that portion of the refresh memory 5 where the pattern data is not written, is kept unchanged. Accordingly, new pattern data can be written in the refresh memory 5 without erasing pattern data having been previously written therein.

Furthermore, according to the present embodiment, a pair of buffers are alternately subjected to a writing operation for storing the output of a vector generator, and one of the buffers is subjected to a reading operation during the time the other buffer is subjected to the above writing operation. Accordingly, the vector generator can operate without having any waiting time.

In addition, according to the present embodiment, a pair of adjacent display blocks are covered by two buffers. Accordingly, the previously-mentioned bad influence can be eliminated which is produced when pattern data is written in only an edge portion of a conventional buffer.

As mentioned above, according to the present invention, it is not required to provide buffers, the number of which is equal to the number of colors necessary for color display, and therefore the total capacity of buffers can be reduced.

We claim:

1. A graphic processor comprising:
   first means for outputting X- and Y-coordinates indicative of the display position of each of a plurlity of dots forming a pattern to be displayed, and for outputting color data of said pattern, said pattern being divided into a matrix of unit areas;
   second means connected to said first means for holding said color data;
   buffer means responsive to said X- and Y-coordinates from said first means for successively storing data indicative of the respective positions of a line of dots included in a unit area of said pattern; and
   refresh memory means, connected to said second means and said buffer means and having a plurality of memory areas each assigned to a respective unit area of said pattern, for storing color data for the picture elements forming the display face of a display device, said memory areas being addressable so that said color data received from said second means is stored in memory area selected according to said data indicative of the positions of a line of dots included in said unit area as stored in said buffer means and within the selected memory area at the storage location assigned to said unit area of the pattern.

2. A graphic processor according to claim 1, wherein said buffer means includes a plurality of memory means corresponding to the respective X- and Y- coordinates in a unit area of said pattern, and means for addressing the memory means corresponding to said X- and Y-coordinates from said first means to output to said buffer means a signal which indicates the position of one dot in said unit area according to the position of the memory means being addressed.

3. A graphic processor according to claim 2, wherein said refresh memory means includes a plurality of random access memories, the number of which is equal to the number of memory means included in said buffer means, and each of said random access memories is connected to receive the output of a corresponding one of said memory means through a write enable signal line so that the output of each memory means will enable the writing of color data in a respective random access memory.

4. A graphic processor for supplying to a display device graphic data to form on an image plane a display image made up of a plurality of display blocks arranged in X and Y directions with each display block consisting of the same predetermined number of dots, so that said display image forms a dot matrix in which dots at each dot location of the matrix appear in one of at least two different colors, including black and white, to represent a pattern, said graphic processor comprising:

(a) first means for generating the addresses in said X and Y direction of selected dot location of said dot matrix and color data indicating the color of the dot to appear at each selected dot location to form a pattern;

(b) second means connected to said first means for holding said color data;

(c) refresh memory means connected to said second means for storing color data for said display image to be read out to said display device, including a plurality of individually addressable memory areas each having a number of addressable storage locations equal to said predetermined number of dots in each display block in said display image, and into which storage locations color data received from said second means may be stored in response to an applied storage location address and a memory area designating signal;

(d) buffer means connected to said refresh memory means and having a plurality of addressable storage locations at least equal to the number of memory areas in said refresh memory means for storing in respective storage locations thereof a signal designating a respective memory area of said refresh memory means;

(e) addressing means connected to said first means, said refresh memory means and said buffer means for applying to said refresh memory means the X and Y addresses of a corresponding storage location each memory area and for controlling said buffer means to read out to said refresh memory means the signal designating at least one memory area in response to the addresses in said X and Y directions generated by said first means, so that color data from said second means will be stored in a storage location of at least one memory area of said refresh memory means.

5. A graphic processor according to claim 4, wherein said addressing means includes buffer control means responsive to said first means generating a succession of addresses in said X and Y directions for controlling said buffer means to simultaneously read out to said refresh memory means signals disignating a plurality of memory areas, so that the color data stored in said second means is stored simultaneously at said corresponding storage location indicated by said single address in each of said plurality of storage areas.

6. A graphic processor according to claim 5, wherein said addresses in said X and Y directions generated by said first means each include a first portion designating the display block address and a second portion designating the dot address within the display block in the X or Y directions of the display image, said addressing means including means for applying to said refresh memory means the first portions of addresses in said X and Y directions from said first means as the X and Y addresses of said corresponding storage location in each memory area.

7. A graphic processor according to claim 6, wherein said buffer control means includes decoder means responsive to the second portion of each address from said first means for addressing a storage location in said buffer means to select a signal designating a memory area in which there is stored the color data for the designated dot address in all display blocks.

8. A graphic processor according to claim 7, wherein said buffer means comprises at least one buffer memory consisting of a matrix of memory devices each providing an output signal designating a respective memory means of said refresh memory means in response to an input signal from said decoder means.

9. A graphic processor according to claim 8, wherein said buffer means comprises a pair of buffer memories, and wherein said buffer control means further comprises control means for applying the second portion of said addresses in said X and Y directions generated by said first means to said decoder means for addressing storage locations in one buffer memory while applying output signals from the other buffer memory to said refresh memory means in one operating state and for causing the other buffer memory to be addressed by said decoder means while applying output signals from the one buffer memory to the refresh memory means in the other state.

10. A graphic processor according to claim 9, wherein said first means includes vector generator means for generating starting addresses in said X and Y directions of a dot location of said dot matrix which represents the start of a pattern and increment/decrement signals for generating succeeding addresses of said pattern, and counter means for storing said starting addresses in said X and Y directions and for incrementing or decrementing in response to said increment/decrement signals to produce aid succeeding addresses.

11. A graphic processor according to claim 10, wherein said counter means includes an X address counter and a Y address counter, each having a first stage for the first portion of an address and a second stage for the second portion of the address, said second stage being connected to said first stage to apply carry and borrow signals thereto and being controlled by said incrment/decrement signals from said vector generator means.

12. A graphic processor according to claim 11, wherein said buffer control means further comprises switching means responsive to said carry and borrow signals from said counter means for controlling said control means to switch between said first and second states each time the addresses generated by said first means in either the X or Y directions pass from one display block to another in said display image.

13. A graphic processor according to claim 4, wherein said addresses in said X and Y directions generated by said first means each include a first portion designating the display block address and a second portion designating the dot address within the display block in the X or Y directions of the display image, said addressing means including means for applying to said refresh memory means the first portions of addresses in said X and Y directions from said first means as the X and Y addresses of said corresponding storage location in each memory area.

14. A graphic processor according to claim 4, wherein said addresses in said X and Y directions generated by said first means each include a first portion designating the display block address and a second portion designating the dot address within the display block in the X and Y directions of the display image, said buffer control means including decoder means responsive to the second portion of each address from said first means for addressing a storage location in said buffer means to select a signal designating a memory area in which there is stored the color data for the designated dot address in all display blocks.

15. A graphic processor according to claim 14, wherein said first means includes vector generator means for generating starting addresses in said X and Y directions of a dot location of said dot matrix which represents the start of a pattern and increment/decrerent signals for generating succeeding addresses of said pattern, and counter means for storing said starting addresses in said X and Y directions and for incrementing or decrementing in response to said increment/decrement signals to produce said succeeding addresses.

16. A graphic processor according to claim 15, wherein said counter means includes an X address counter and a Y address counter, each having a first stage for the first portion of an address and a second stage for the second portion of the address, said second stage being connected to said first stage to apply carry and borrow signals thereto and being controlled by said increment/decrement signals from said vector generator means.

17. A graphic processor according to claim 16, wherein said buffer means comprises a pair of buffer memories, and wherein said buffer control means further comprises control means for applying the second portion of said addresses in said X and Y directions generated by said first means to said decoder means for addressing storage locations in one buffer memory while applying output signals from the other buffer memory to said refresh memory means in a first operating state and for causing the other buffer memory to be addressed by said decoder means while applying output signals from the one buffer memory to the refresh memory means in a second operating state.

18. A graphic processor according to claim 17, wherein said buffer control means further comprises switching means responsive to said carry and borrow signals from said counter means for controlling said control means to switch between said first and second operating states each time the addresses generated by said first means in either the X or Y directions pass from one display block to another in said display image.

19. A graphic processor for supplying to a display device graphic data to form on an image plane a display image made up of a plurality of display blocks arranged in X and Y directions with each display block consisting of the same predetermined number of dots, so that said display image forms a dot matrix in which dots at each dot location of the matrix appear in one of at least two different colors, including black and white, to represent a pattern, said graphic processor comprising:

(a) first means for generating the addresses in said X and Y directions of selected dot locations of said dot matrix and color data indicating the color of the dot to appear at each selected dot location to form a pattern;

(b) second means connected to said first means for holding said color data;

(c) refresh memory means connected to said second means for storing color data for said display image to be read out to said display device, including a plurality of individually addressable memory areas each having a number of addressable storage locations equal to said predetermined number of dots in each display block in said display image, and into which storage locations color data received from said second means may be stored in response to an applied storage location address and a memory area designating signal, each memory area storing the color data for a corresponding dot location in each display block so that the color data for each of the dots which make up a single display block are stored at the same address of respective memory areas; and (d) means connected to said first means and said refresh memory means for addressing said refresh memory means in response to the addresses in said X and Y directions generated by said first means so that the color data held by said second means may be stored simultaneously in a corresponding storage location of a plurality of memory areas.

20. A graphic processor according to claim 19, wherein said addresses in said X and Y directions generated by said first means each include a first portion designating the display block address and a second portion designating the dot address within the display block in the X or Y directions of the display image, said addressing means including means for applying to said refresh memory means the first portions of addresses in said X and Y directions from said first means as the X and Y addresses of said corresponding storage location in each memory area.

21. A graphic processor according to claim 19, wherein said addresses in said X and Y directions generated by said first means each include a first portion designating the display block address and a second portion designating the dot address within the display block in the X and Y directions of the display image, and wherein said addressing means includes buffer means responsive to said first means for simultaneously applying to said refresh memory means a plurality of memory area enabling signals based on the second portion of a plurality of said addresses in said X and Y directions generated sequentially by said first means.

22. A graphic processor according to claim 21, wherein said addressing means further includes means for applying to said refresh memory means the first portionsof addresses in said X and Y directions from said first means as the X and Y addresses of said corresponding storage locatin in each memory area.

23. A graphic processor apparatus comprising:

(a) first means for outputting positional data of picture elements forming a pattern to be displayed on a display device and color data for said pattern, said pattern being divided into a matrix of unit areas each formed by a plurality of picture elements;

(b) second means for holding said color data;

(c) buffer means for storing in respective storage locations thereof positional data provided from said first means for one or more picture elements of a unit area of said pattern; and (d) refresh memory means connected to said buffer means and having a plurality of memory locations each corresponding to a respective picture element of said pattern and being addressable by said positional data, wherein said color data is sent from said second means to a corresponding memory location in said refresh memory means according to said storage location used in storing said positional data in said buffer means and at least part of said positional data received from said first means.

* * * * *